United States Patent [19]

Yoshida et al.

[11] Patent Number: 5,036,187
[45] Date of Patent: Jul. 30, 1991

[54] PHOTODETECTING CIRCUIT WITH COMPENSATED INTEGRATION SIGNAL

[75] Inventors: Shigeo Yoshida; Isamu Fujimoto, both of Chiba, Japan

[73] Assignee: Dowa Mining Co., Ltd., Tokyo, Japan

[21] Appl. No.: 517,769

[22] Filed: May 2, 1990

[30] Foreign Application Priority Data

May 8, 1989 [JP] Japan .................................. 1-114648

[51] Int. Cl.$^5$ .......................... G01V 9/04; H01J 40/14
[52] U.S. Cl. .................................. 250/214 B; 250/221
[58] Field of Search ................ 250/221, 222.1, 214 B, 250/214 C; 341/5, 24, 31; 340/712

[56] References Cited

U.S. PATENT DOCUMENTS

| | | | |
|---|---|---|---|
| 3,775,560 | 11/1973 | Ebeling et al. .......................... 178/18 |
| 3,860,754 | 1/1975 | Johnson et al. .......................... 178/18 |
| 4,061,925 | 12/1977 | van der Gaag et al. ......... 250/214 B |
| 4,243,879 | 1/1981 | Carroll et al. .......................... 250/221 |
| 4,366,378 | 12/1982 | Simons ............................. 250/214 B |
| 4,645,920 | 2/1987 | Carroll et al. ......................... 250/221 |
| 4,681,432 | 7/1987 | Kawabata et al. ............... 250/214 B |
| 4,694,182 | 9/1987 | Howard .......................... 250/214 B |
| 4,799,044 | 1/1989 | Masters et al. .................. 250/214 B |
| 4,851,689 | 7/1989 | Hasegawa ........................ 250/214 B |

Primary Examiner—David C. Nelms
Assistant Examiner—Michael Messinger
Attorney, Agent, or Firm—Cushman, Darby & Cushman

[57] ABSTRACT

The optical input detection apparatus is adapted to integrate the value of the light received corresponding to the sum of the value of the light received by the light receiving device during driving of the light emitting device and the external flood light, deduct from the integration value the value of the light received equivalent to the external flood light received by the photodetector during the non-driving period following the driving of the light emitting device, compensate the integration value to the signal corresponding to the light emitting output and output the compensated signal to the comparator for comparison. Consequently, the presence or absence of an interruption in the light beam may be detected without being affected by the external flood light.

2 Claims, No Drawings

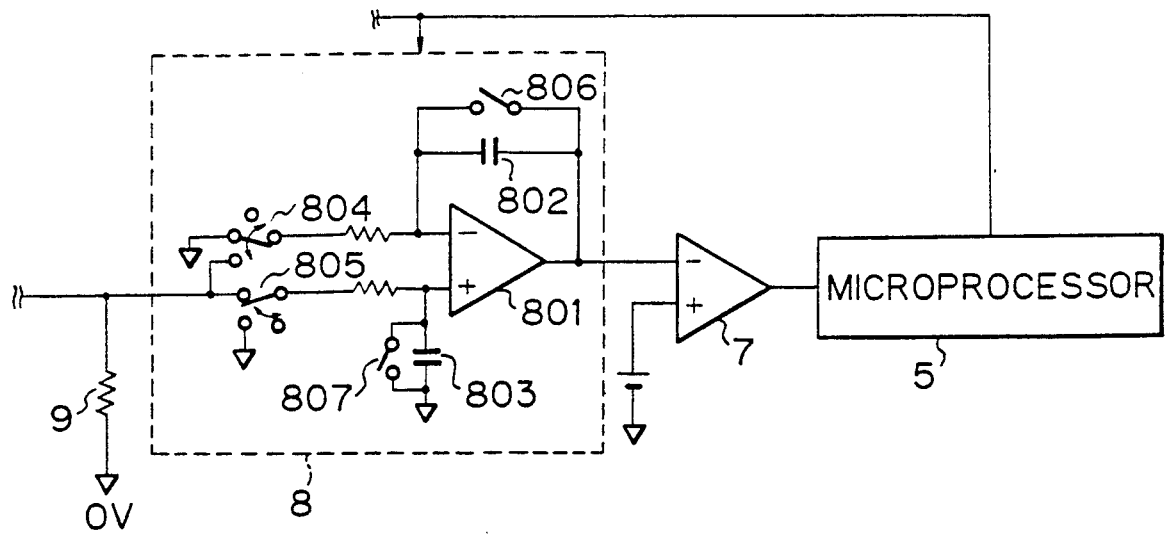

PHOTODETECTING CIRCUIT WITH COMPENSATED INTEGRATION SIGNAL

BACKGROUND OF THE INVENTION

The present invention relates to an optical input detection apparatus adapted to detected whether a light beam emitted from a light emitting device to a photodetector has been interrupted.

There has been known such a device as shown in FIG. 1, comprising a detection panel 3 constituted by arranging a plurality of pairs of light emitting devices 1 and photodetectors 2 opposedly in a predetermined spaced relationship and adapted to detect the location of an object 4 on the panel by successively activating the pair of light emitting devices.

FIG. 2 schematically illustrates the constitution of the processing circuit for the received light signals including a pair of light emitting devices 1 and the photodetector 2 on the panel. In FIG. 2, the light output from the light emitting devices 1, which are driven and controlled by the microprocessor 5 through the light emitting device multiplexer is received by a corresponding pair of photodetectors 2 and converted into electrical signals. The signals are then supplied to the amplifying circuit 6 via the photodetector multiplexer and amplified to output signals of a specified level. The amplified signals are input to the comparator 7 where they are compared to the reference level and the compared output is then supplied to the microprocessor 5. More specifically, as shown in FIG. 3(A), if the light emitting device 1 is driven in a specified cycle, the received output as shown in FIG. 3(B) via the paired photodetectors 2 and the amplifying circuit 6 is input ot the comparator 7. However, if the light beam is interrupted by the object 4, no light is received. The comparator 7 is adapted to compare the output from the amplifier 6 with the reference level $V_f$ and provide "low" signals when the output exceeds the reference level and "high" signals when the output is less than the reference levels as shown in FIG. 3(C). The output from the comparator is taken in a constant timing while the light emitting device 1 is being driven and then output as shown in FIG. 3(D) and a decision is made that there is no object present in the case of a "low" signal and that there is an object present in the case of a "high" signal.

The operation to detect the presence of an object in the apparatus as shown in FIG. 3 may cause an erroneous detection whent the light source, namely an external flood light is very intense.

FIG. 4 illustrates an operation in which erroneous detection may be caused. In FIG. 4(B), when light is not interrupted by an object, the input to the comparator 7 corresponds to the amount of received light obtained by adding the output light from the light emitting device 1 and the external flood light and far exceeds the reference level $V_f$ [indicated by the dotted line in FIG. 4(B)] to be compared. Consequently, the output from the comparator 7 will be a "low" signal and may be detected as a sign of no object being present. However, when the light beam from the light emitting device 1 is interrupted by an object, the input corresponding to the external flood light is supplied to the comparator 7 and when the value of the input is higher than the reference level, the output from the comparator 7 is "low" which may cause the presence of an object to be overloocked and a state of absence to be actually registered.

Accordingly an object of the present invention is to provide an optical input apparatus adapted to reliably detect the presence of an object without being adversely affected by an external flood light.

SUMMARY OF THE INVENTION

The present invention may be attained by comprising a means adapted to provide integrated signals by integrating the light reception signals representing the value of the light received by the photodetector while the light emitting device is being driven, a means for acquiring the compensated integration signals by deducting from the integrated signals the external flood light signals representative of the value of the external flood light received by the photodetector during a specified period of time in which the light emitting device is not driven after the device has been driven, and a comparison means for comparing the compensated integration signal with the reference signal. The present invention is adapted to integrate the value of the received light equivalent to the sum of the light emitting output of the light received from the photodetector while the light emitting device is driven and the external flood light, deduct from the integrated value the value of the received light corresponding to the external flood light received by the photodetector while the light emitting device is not driven after it has been driven and compensate the integrated value to the signal corresponding only to the light emitting output to provide output to the comparator for comparison. As the consequence, interruption of the light beam may be detected by excluding the affect by the external flood light.

Furthermore, according to an embodiment of the present invention, during a detection period while detection is made as to whether a light beam irradiated against a pair of the light emitting device and the photodetector has been interrupted or not, the light emitting device is repetitively driven and not driven for the same period of time for a plurality of times, and the integrated signal with the value of the light received deducted therefrom will be the value of the integrated value of the light received during the respective non-driving period of the light emitting device with the external flood signals deducted therefrom.

Therefore, according to the present invention, the integrated value of the external flood light received during the non-driving period for a plurality of times after the light emitting device has been driven is deducted from the integrated value of the light received during the driving period of the light emitting device for a plurality of times and compensated so as to be a signal corresponding only to the light emitting output for a plurality of times; this compensated signal is output for comparison. This ensures accuracy in the output signals and since the signals are integrated, they are very stable and not affected by noise.

DETAILED DESCRIPTION OF THE INVENTION

Figure 1:
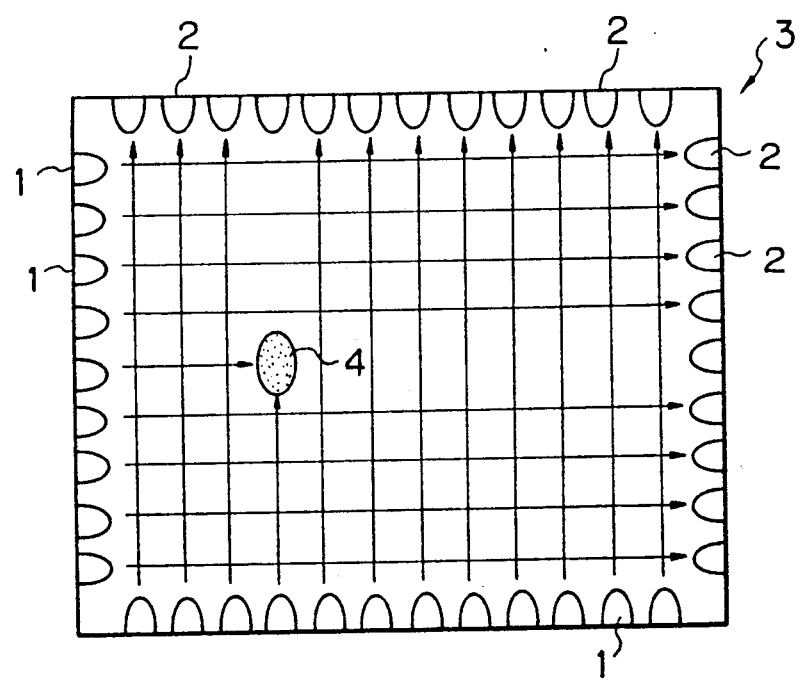
FIG. 1 illustrates a panel which has been used for arranging the light emitting devices and photodetectors.
Figure 2:
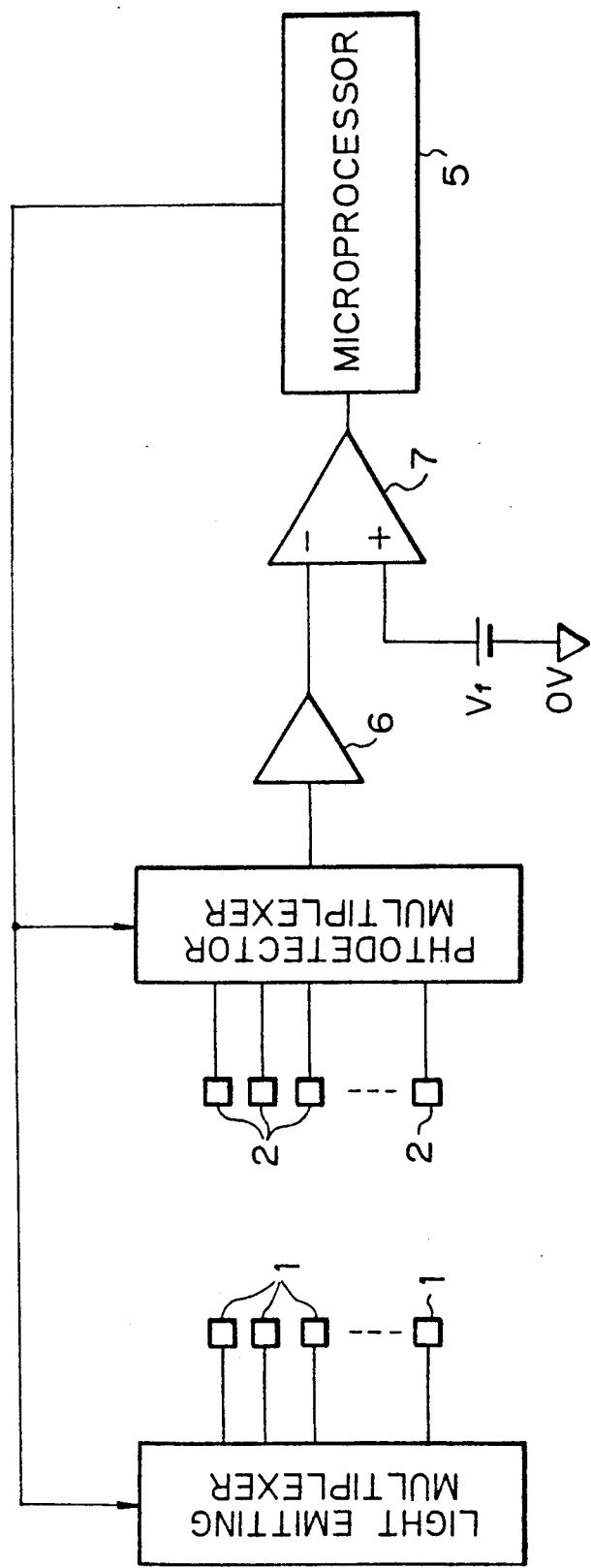
FIG. 2 schematically illustrates the optical input detection apparatus according to a prior art.
Figure 3:
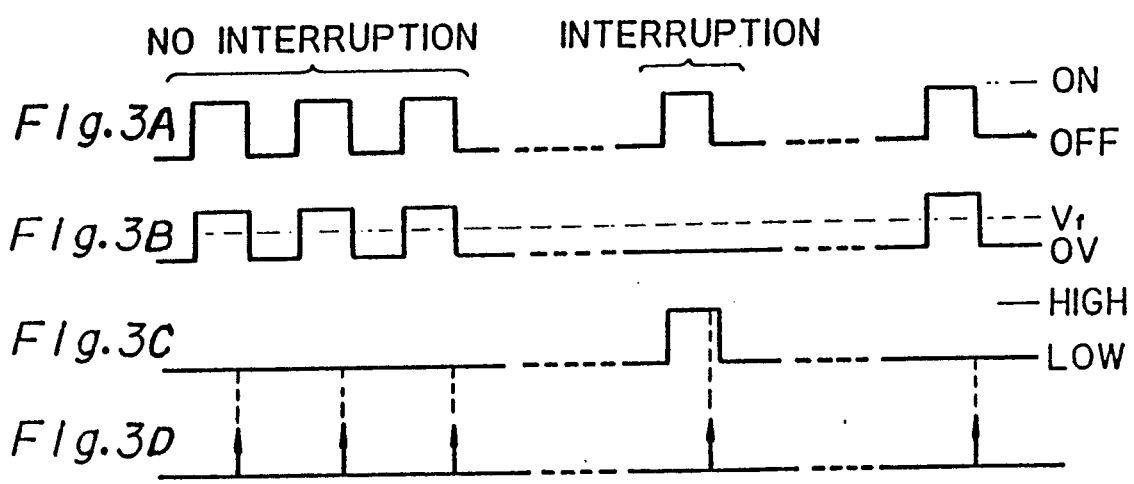
FIG. 3 is a timing chart explaining the detection operation by the apparatus shown in FIG. 2.
Figure 4:
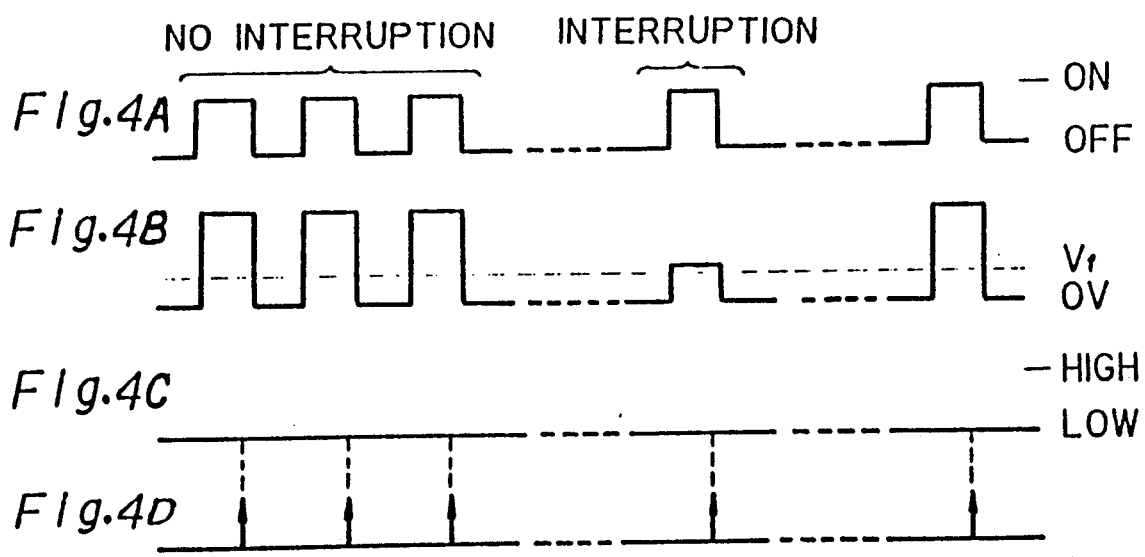
FIG. 4 is a timing chart explaining the problems with the apparatus shown in FIG. 2.
Figure 5:
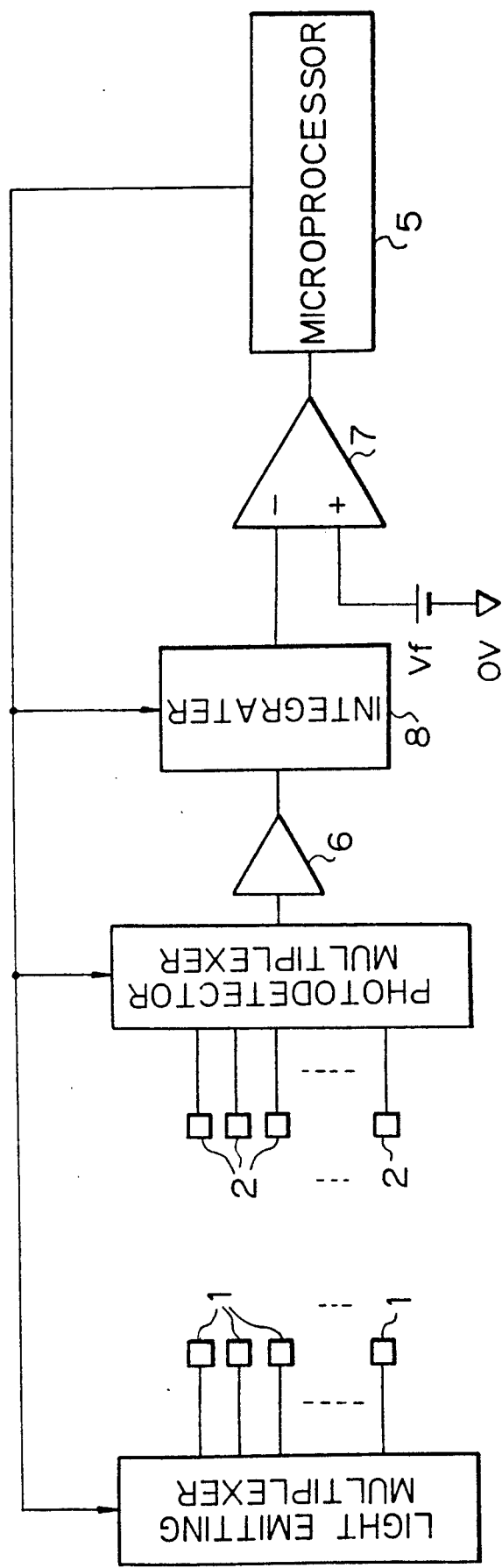
FIG. 5 illustrates an embodiment of the present invention.

FIG. 5 illustrates the schematic constitution of an embodiment of the present invention and the same components as those in FIG. 2 are denoted by the same numerals; explanation thereof is not repeated. The difference between FIG. 5 and FIG. 2 is that before the output from the amplifier 6 is input to the comparator 7, it is charged and discharged by the integrator 8, and the received light output (which the external flood light is deducted therefrom) corresponding to the light emitting output is extracted and provided to the comparator 7 for comparison with the reference level $V_f$. Charging and discharging by the integrator 8 is controlled by the microprocessor 5.

Figure 6:
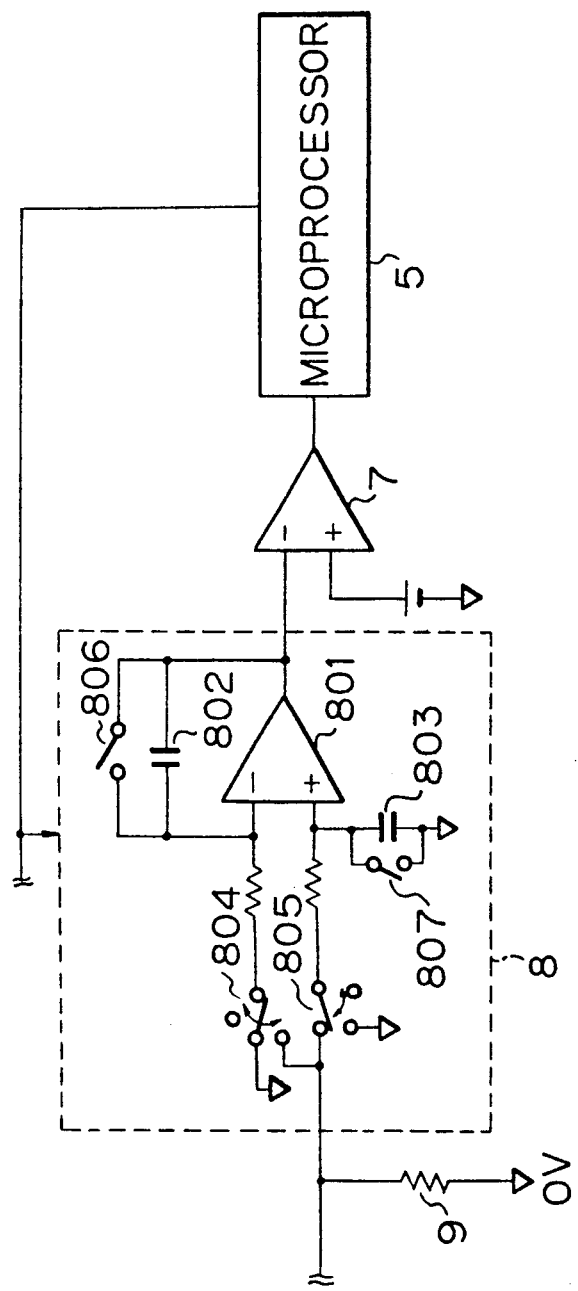
FIG. 6 is a block diagram showing the detail of FIG. 5.

FIG. 6 is an illustration of a detailed circuit diagram in which the photodetector 2 in FIG. 5 is a phototransistor. The current output which is output from the photodetector 2 in FIG. 6 is converted to a voltage signal by the resistor 9 for the current/voltage converter corresponding to the amplifier 6 and input to the integrator 8. The integrator 8 comprises of the operational amplifier 801, the capacitors 802 and 803, and the switches 804 through 807. The switch 804 is adapted to switch the negative side of the operational amplifier 801 to either of the reception terminal for the input signal, the common potential terminal of the "zero" level voltage or the release terminal. The switch 805 is adapted to switch the positive side of the operational amplifier 801 to either of the reception terminals, the common potential terminal or the release terminal. The switches 806 and 807 are connected in parallel to the capacitors 802 and 803 and function to discharge the accumulated charge.

Figure 7:
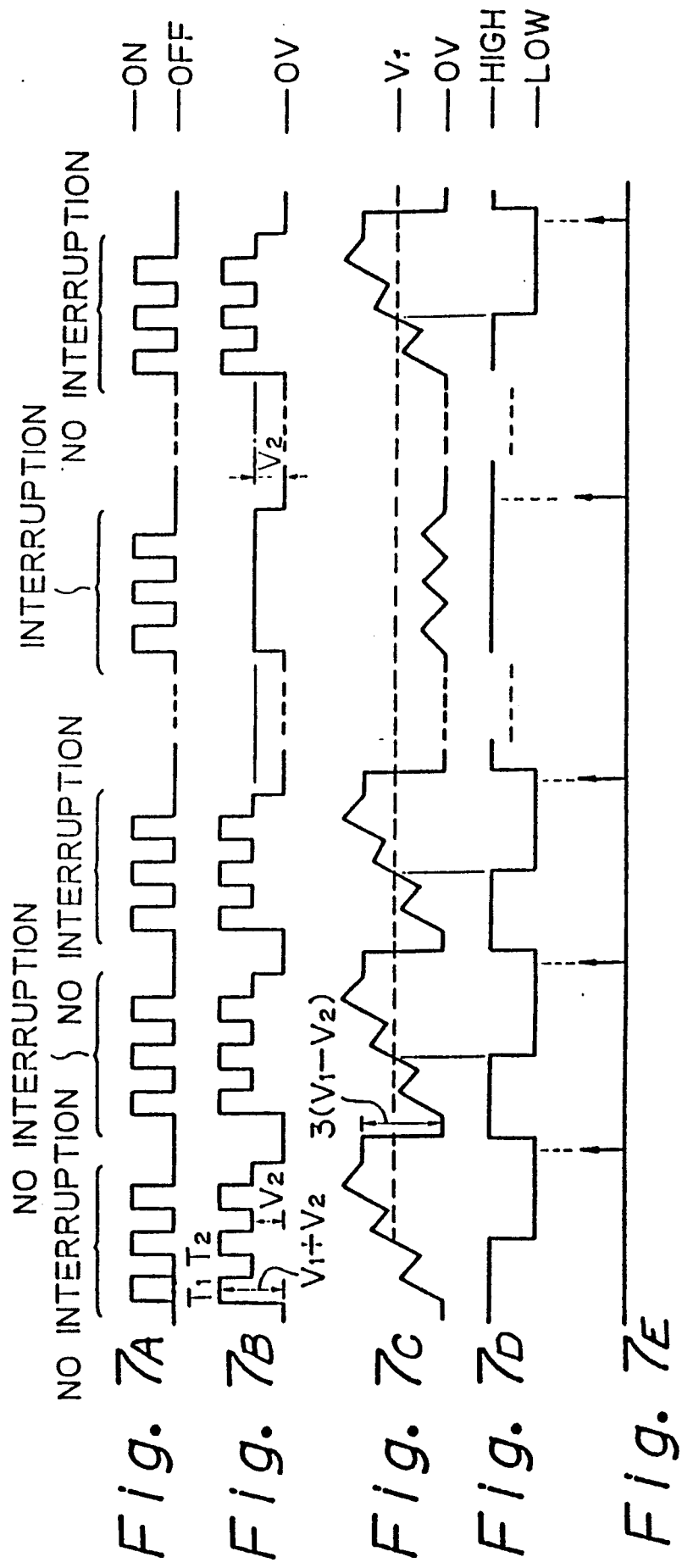
FIG. 7 is a timing chart explaining the operation of the present invention.

FIG. 7 is a timing chart explaining operation of the apparatus shown in FIG. 5 or more specifically in FIG. 6. As shown in FIG. 7(A), the light emitting device 1 is driven a plurality of times or three times (in the illustrated example) during which the driving period $T_1$ is equivalent to the non-driving period $T_2$, for detecting the presence of an object between a pair of the light emitting device 1 and the photodetector 2. On the other hand, the paired photodetector 2 are driven in the operational condition during the time corresponding to the driving three times. As shown in FIG. 7(B), when the object does not interrupt the light, the signal $(V_1+V_2)$ corresponding to the sum of the light emitting output and the external flood light during light emitting driving and the signals $V_2$ corresponding only to the external flood light during a light emitting non-driving period are respectively output and these signals are supplied to the integrator 8. When the object interrupts the light, the signal $V_2$ corresponding only to the external flood light is output from the photodetector 2 while the light emitting device 1 is driven to emit light. The respective switches of the integrator 8 are controlled for switching by the microprocessor 5. While the photodetector 2 is driven, the switches 806 and 807 are opened. The switches are closed immediately when the photodetector 2 is not driven, and the charge of the capacitors connected in parallel to these switches is discharged. During the period $T_1$ in which the light emitting 1 is driven, the switch 804 is so controlled as to be connected to the common potential terminal and the switch 805 is so controlled as to be connected to the reception terminal. the signals $(V_1+V_2)$ indicating no interruption in the light or the signals $V_2$ indicating the presence of an interruption in the light which have been input during the period $T_1$ are directed to the input end of the positive side of the operational amplifier 801 and integrated as shown in FIG. 7(C) to increase with a constant gradient. During the non-driving period $T_2$ following the driving of the light emitting device 1, the switch 804 is so controlled as to be connected to the reception terminal and the switch 805 is so controlled as to be connected to the common potential terminal. As a result, the signal $V_2$ corresponding to the external flood light is directed to the input terminal of the negative side of the operational amplifier 801 and inverted to be integrated, so that the accumulated charge by the integration will be discharged at a constant gradient and the integrated value of the signal $V_2$ corresponding to the external flood light will be deducted therefrom. These operations comprising an accumulation in the charge (period $T_1$) and discharge (period $T_2$) are repeated three times for one scanning period for one light emitting device 1. When the third period $T_2$ of non-driving is over, the switches 804 and 805 are so controlled as to be connected to the release terminal side, and the current output from the integrator 8 is maintained. More specifically, when the light is not interrupted by an object, three times as much of the potential with the external flood light deducted therefrom $(V_1-V_2)$ is held. On the contrary when the light is interrupted by the object, the output of the potential $(V_2-V_2)=0$ is held.

The output of the integrator 8 which has thus been held is then input to the comparator 7 and compared with the reference level. As shown in FIG. 7(D), the output from the comparator 7 is referred to as a "low" signal when the input exceeds the reference level, and a "high" signal when the input is less than the reference level. In this way, when the light is not interrupted by the object, the "low" signal will be output at least in the third period $T_1$, while the "high" signal will be output at least on completion of the third period $T_2$ when the light is interrupted by the object. The output of the comparator 7 is supplied to the microprocessor 5. While the output from the integrator 8 is held after the third period $T_2$ is over, the microprocessor 5 is adapted to take the output from the comparator 7 in accordance with the timing as shown in FIG. 7(E). The microprocessor 5 decides that the light has not been interrupted by an object when the taken signal is "low", and that the light has been interrupted by an object when the taken signal is "high".

Figure 8:
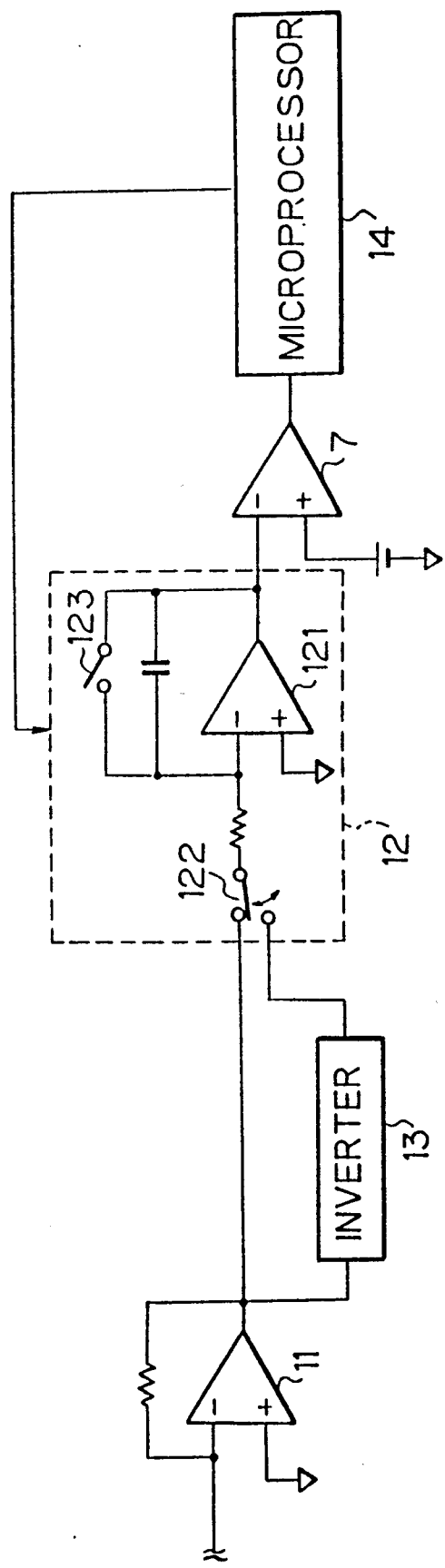
FIG. 8 is another block diagram showing the detail of FIG. 5.

FIG. 8 illustrates another embodiment of the present invention different from the one shown in FIG. 6 wherein the photodetector 2 is a phototransistor. In FIG. 8, the current signal output from the photodetector 2 is supplied to the current/voltage coverting amplifier 11 and here converted to an inverted negative potential signal which is, in turn, supplied to one of the input terminals of the integrator 12 and the inverter 13. The positive output from the inverter 13 is further supplied to the other of the input terminals of the integrator 12. The integrator 12 comprises the operational amplifier 121, and the switches 122, 123 to be controlled by the microprocessor 14. The switch 122 serves to direct the input either to one or other of the input terminals to the negative side of the operational amplifier 121. The switch 123 is operated in a similar manner to the switch 806. In the period $T_1$ shown in FIG. 7 in which the light emitting device 1 is driven for light emitting, the switch 122 is connected to one of the input terminals, so that the potential signal from the current/potential converting amplifier 11 is integrated in the integrator 12. In the non-operating period $T_2$ following the period $T_1$ driven for light emitting, the switch 122 is so controlled as to be connected to the other of the input terminals and the output from the iverter 13 is directed to the integrator 12 so that the accumulated charge will be discharged. In this way, the detection operation for detecting presence or absence of interruption of the light by an object may be provided in the same operation as illustrated in FIG. 7.

In the same manner as in the embodiment described above, if a light emitting operation for a plurality of times or charging and discharging operation for integration for a plurality of times is executed in the detection operation for one time of a pair of the light emitting diode and photodetector, signal of the light emitting output itself with the external flood light excluded may be extracted to enable a more accurate detection to be realized. It is a matter of fact that the present invention may be embodied by executing driving once for light emitting and non-driving once following the driving in the detection operation for one time thereby removing the external flood light.

It is further to be noted that control of the integrator in FIG. 5 may be embodied by control of a logic circuit without using the software of the microprocessor 5.

In FIG. 5, an analog/digital converter may be connected in placed of the comparator 7, so that the analog output from the integrator 8 is converted into a digital value and input to the microprocessor 5. It may be compared to the reference value in accordance with the program of the microprocessor 5. In this case, the analog/digital converter which is provided at the microprocessor may be used.

While the present invention has been described in connection with a preferred embodiment thereof, it will be understood that it is not intended to limit the invention to that embodiment only. On the contrary, it is intended to cover all alternatives, modifications and equivalents as may be reasonably included within the spirit and scope of the present invention as defined by the appended claims.

What is claimed is:

1. A photodetecting circuit having at least one pair of a light emitting device and a photodetector spaced from each other for a specified distance and adapted to detect presence or absence of interruption of a light beam emitted from said light emitting device to said photodetector, comprising:
   means for integrating a light reception signal representing a value of light received by said photodetector while said light emitting device is driven to provide an integrated signal;
   means for acquiring a compensated integration signal by deducting from said integrated signal an external flood light signal representing a value of an external flood light received by said photodetector in a non-driving period of said light emitting device following the driving of said light emitting device; and
   means for comparing said compensated integration signal with a reference signal, thereby detecting the presence or absence of an interruption in said light beam without being affected by the external flood light;
   wherein durin one detection period, said light emitting device is successively driven and not driven for equal periods for a plurality of times, and said compensated integration signal has a value obtained by deducting the external flood light during the respective non-driving periods from the integration value of the light reception signal during the respective driving periods.

2. A photodetector circuit having at least one pair of a light emitting device and a photodetector spaced from each other for a specified distance and adapted to detect presence or absence of an interruption of a light beam emitted from said light emitting device to said photodetector, comprising:
   means for driving the light emitting device in successive on and off periods of approximately equal duration, for a predetermined detection time;
   means for integrating a light reception signal representing a value of light received by said photodetector during the on period of said light emitting device to provide a first integrated signal, and for integrating an external flood light signal representing a value of an external flood light received by said photodetector during the off period of said light emitting device to provide a second integrated signal;
   means for producing a compensated integration signal by deducting said second integrated signal from said first integrated signal during each of the off periods of the detection time; and
   means for comparing said compensated integration signal with a reference signal to detect the presence or absence of the interruption in said light beam during the detection time.

* * * * *